United States Patent [19]

Siol et al.

[11] Patent Number: 4,900,791
[45] Date of Patent: Feb. 13, 1990

[54] COMPATIBLE POLYBLENDS

[75] Inventors: Werner Siol, Darmstadt-Eberstadt; Ulrich Terbrack, Reinheim, both of Fed. Rep. of Germany

[73] Assignee: Röhm GmbH Chemische Fabrik, Darmstadt, Fed. Rep. of Germany

[21] Appl. No.: 160,313

[22] Filed: Feb. 25, 1988

[30] Foreign Application Priority Data

Mar. 16, 1987 [DE] Fed. Rep. of Germany ....... 3708427

[51] Int. Cl.$^4$ ................. C08L 33/00; C08G 63/52
[52] U.S. Cl. ................................ 525/228; 528/303; 528/306
[58] Field of Search ................. 525/228; 528/306, 303

[56] References Cited

U.S. PATENT DOCUMENTS

| | | |
|---|---|---|
| 3,846,368 | 11/1974 | Pettit, Jr. .............................. 525/228 |
| 4,112,023 | 9/1978 | Gore et al. .......................... 525/228 |
| 4,414,053 | 11/1983 | Karim et al. ........................ 525/228 |

FOREIGN PATENT DOCUMENTS

| | | |
|---|---|---|
| 0963368 | 12/1983 | European Pat. Off. ............ 525/228 |
| 0177063 | 4/1986 | European Pat. Off. . |
| 0181485 | 5/1986 | European Pat. Off. . |

OTHER PUBLICATIONS

Chemical Abstracts, vol. 84, No. 13, Jan. 26, 1976, p. 79, Resume No. 18226x, Columbus Ohio, US.
I. I. Maleev et al: "Surface Pressure of Mixtures of Methacrylate Polymers with poly(methyl acrylates)", Tezisy Dokl.—Resp. Konf Vysokomol. Soedin 3rd Journal of Applied Polymer Science, vol. 17, 1973, pp. 2443-2455.
L. H. Sperling et al.: "Glass Transition Behavior of Latex Interpenetrating Polymer Networks Based on Methacrylic/Acrylic Pairs", pp. 2445-2450.
Polymer-Polymer Miscibility, 1979 Academic Press, pp. 160, 161, 203, 204, 233, 234.

*Primary Examiner*—John C. Bleutge
*Assistant Examiner*—Susan Berman
*Attorney, Agent, or Firm*—Oblon, Spivak, McClelland, Maier & Neustadt

[57] ABSTRACT

The invention relates to compatible polymer blend comprised of two disparate polymers, namely:
(A) 1-99 wt. % of a first polymer comprised of monomer units of formula (I):

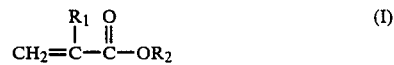

(I)

wherein $R_1$ is hydrogen or methyl, and $R_2$ is ethyl or a hydrocarbon with 4–40 carbon atoms; and
(B) 99-1 wt. % of a second polymer comprised of monomer units of formula (II):

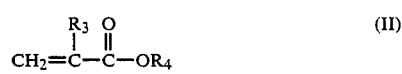

(II)

wherein $R_2$ is hydrogen or methyl, and
$R_4$ is ethyl or a hydrocarbon group with 4–40 carbon atoms; and wherein:
(a) the sum of (A)+(B)=100 wt. %;
(b) when $R_2$ and $R_4$ are the same, then $R_1$ and $R_3$ are different, and when $R_1$ and $R_3$ are the same, then $R_2$ and $R_4$ are different; and
(c) the groups $R_2$ and $R_4$ have similar van der Waals volumes.

21 Claims, No Drawings

COMPATIBLE POLYBLENDS

BACKGROUND OF THE INVENTION

1. Field of the Invention

The invention relates to compatible polyblends (polymer blends) comprised of two disparate polymethacrylates and/or polyacrylates.

2. Discussion of the Background

Decades ago, the experience with the miscibility of disparate polymers was summarized thusly: "In polyblends miscibility is the exception and immiscibility is the rule." (Dobry, A. and Boyer-Kawenoki, F., 1947, *J. Polym. Sci.*, 2: 90.) In the meantime a number of systems comprised of disparate polymers have been described which formally satisfy the criteria of miscibility; however, such systems remain exceptions which "confirm the rule". (See Olabisi, O., Robeson, L. M., and Shaw, M. T., 1979, "Polymer-polymer miscibility", pub. Academic Press; and 1982 "Kirk-Othmer encyclopedia of chemical technology", 3rd Ed., Vol. 18, 443–478, pub. John Wiley.

For example, Olabisi et al., loc. cit., 233–238, have summarized the results with polyacrylates as follows: "Accumulated experience indicates that the members of the acrylate family are not miscible; and the same is true of the systems PMMA/polymethyl arylate and PMMA/polyethyl acrylate. (See Hughes, L. J., and Britt, G. E., 1961, *J. Appl. Polym. Sci.*, 5: 337; and Hughes, L. J., and Brown, G. L., ibid., 580.)"

However, the following are miscible: (i) blends of polystyrene and poly-alpha-methylstyrene, at particular mixture ratios; (ii) blends of particular methyl-substituted polystyrenes, which display compatibility at temperatures above 180° C. (Sillescu et al., 1986, *Makromol. Chem. Rapid Commun.*, 7: 415–419); and (iii) blends of polyvinyl acetate and polymethylacrylate, or polyisopropyl acrylate and polyisopropyl methacrylate (see Krause, S., 1972, *J. Macromol. Sci., Rvs. Macromol. Chem.*, C7, (2): 251–314).

There is some occurrence of miscibility in instances where special interactions, such as hydrogen bridge bonds, electron donor-acceptor complexes, etc., may develop between the disparate polymers. Examples which may be cited are: polystyrene/polyvinyl methyl ether; polystyrene/polyphenylene oxide; polystyrene/tetramethylpolycarbonate; PVC/PMMA; and polyvinylidene fluoride/PMMA ("PVDF/PMMA"). Due to the specific interactions between the monomer units in these polymers, the above-named blends display "lower critical solution temperature" (LCST) behavior. (See "Kirk-Othmer", 3rd Ed., loc. cit. Vol. 18, pp. 451–457.) The occurrence of an LCST, and a UCST (upper critical solution temperature), is expected based on theoretical considerations (Flory theory, and lattice theory), but the important chi parameter which characterizes the interaction must be obtained experimentally. It is not predictable. The relevant statement in Kirk-Othmer (p. 456) reads: "Thus the interaction parameter function cannot be derived from lattice considerations alone and the theory neither provides the understanding of the origin of the observed behavior nor possesses any quantitative predictive capacity."

There is a strong practical interest in polymer blends, particularly in miscible polymer systems, because these yield, for example, the mechanical qualities of the starting polymers, without being subject to phase separation and additive diffusion, which may occur under shear stress. (See "Kirk-Othmer", loc. cit., 449; and Olabisi, O., et al., loc. cit., 287–316.)

In "Kirk-Othmer", loc. cit., 451, it is stated that the concept of "complementary dissimilarity" (see also Olabisi, O., 1975, *Macromolecules*, 8: 316) explains the compatibility of fairly well studied "polymer blends" and has proven valuable as a heuristic principle.

Thus, the above-mentioned examples of compatible polyblends can largely be explained in terms of enthalpic interactions between the component units within polymer P1, and the component units within polymer P2.

For example, the compatible polyblend tetramethyl bisphenol A polycarbonate/polystyrene is accounted for in terms of electron donor-acceptor complex formation (see Barlow, J. W., and Paul, D. R., 1981, *Annu. Rev. Mater. Sci.*, 299–319).

In addition there is a large group of compatible polyblends wherein the compatibility is based on an intramolecular repulsion within a copolymer. This group of polyblends includes, for example, the blend PMMA/styrene-acrylonitrile copolymer. In connection with this repulsion concept it is readily understood that miscibility will be found for a narrowly specific composition of the copolymer; thus the term "miscibility windows" is employed. Here also, exothermic miscibility has been recently discovered (Pfennig, J.-L. G., et al., 1985, *Macromolecules*, 18: 1937–1940). As discussed in unpublished Ger. Pat. App. P 36 38 443.7, this repulsion concept is also applicable to blends of homopolymers. Thus, the compatibility of PVDF/PMMA can be explained in terms of repulsion of the —CH$_2$— and —CF$_2$— groups in PVDF, and repulsion forces between

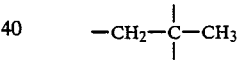

and the carbonyl group in PMMA.

The compatibility in all of the above-mentioned compatible polyblends is ultimately attributable to various specific interactions between very disparate polymers P1 and P2. In the area of poly(meth)acrylates, the accumulated experience indicates little prospect of success in the search for compatible polyblends, because one can expect no specific interactions between two polymers of the same kind.

SUMMARY OF THE INVENTION

Accordingly, one object of the present invention is to provide polymer blends which are completely compatible over a wide temperature range.

Another object of the invention is to provide polymer blends which exhibit an upper critical solution temperature.

These and other objects of the invention which will become apparent from the following specification have been achieved by the compatible polymer blends of the present invention which comprise two disparate polymers, the polymer blend comprising:

(A) 1–99 wt.% of a first polymer comprised of monomer units of formula (I):

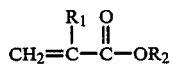

(I)

wherein $R_1$ is hydrogen or methyl, and $R_2$ is ethyl or a hydrocarbon group with 4–40 carbon atoms; and (B) 99-1 wt.% of a second polymer comprised of monomer units of formula (II):

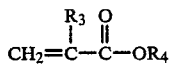

(II)

wherein $R_3$ is hydrogen or methyl, and $R_4$ is ethyl or a hydrocarbon group with 4–40 carbon atoms; and wherein (a) The sum of (A)+(B)=100 wt.%;
(b) when $R_2$ and $R_4$ are the same, then $R_1$ and $R_3$ are different, and when $R_1$ and $R_3$ are the same, then $R_2$ and $R_4$ are different; and
(c) the groups $R_2$ and $R_4$ have similar van der Waals volumes.

DETAILED DESCRIPTION OF THE PREFERRED EMBODIMENTS

It has been discovered, in connection with the invention, that, surprisingly, blends of two disparate poly(meth)acrylates under certain clearly defined limiting conditions are completely compatible. In particular, it has been discovered that polyblends comprised of two disparate polymers P1 and P2 of this class are compatible within the temperature range −100° to +200° C., in a partial range thereof which extends over at least 50° C. The inventive polyblends PB comprised of poly(meth)acrylate esters have the following composition:

(A) 1–99 wt.% preferably 5–95 wt.%, more preferably 10–90 wt.% of a polymer P1 comprised of monomer units of formula (I):

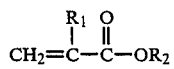

(I)

where $R_1$ represents hydrogen or methyl, and $R_2$ represents ethyl or a hydrocarbon group with 4–40 carbon atoms, preferably 4–24 carbon atoms;

(B) 99-1 wt.%, preferably 95-5 wt.%, * of a polymer P2 comprised of monomer units of formula (II):
(*) more preferably 90-10 wt.%

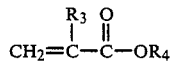

(II)

where $R_3$ represents hydrogen or methyl, and $R_4$ represents ethyl or a hydrocarbon group with 4–40 carbon atoms, preferably 4–24 carbon atoms; and subject to the following conditions:

(a) The sum of (A)+(B)=100 wt.%;
(b) If $R_2$ and $R_4$ are the same, then $R_1$ and $R_3$ are different, and if $R_1$ and $R_3$ are the same, then $R_2$ and $R_4$ are different; and
(c) The groups $R_2$ and $R_4$ have comparable van der Waals volumes.

In addition, it is advantageous if the following condition is satisfied:

(d) The heats of mixing of the following substances are <100 cal/mol:

the hydrogenated monomer units of formula

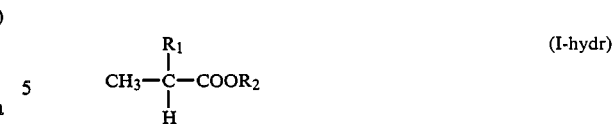

(I-hydr)

and the hydrogenated monomer units of formula

(II-hydr)

where $R_1$, $R_2$, $R_3$, and $R_4$ have the meanings assigned above.

Preferably the differences in the van der Waals volumes according to Bondi, in connection with requirement (B)(c), above, are <30% (see Bondi, A., 1964, *J. Phys. Chem.*, 68: 441).

Usually one is not forced to carry out a determination of the heat of mixing of the hydrogenated monomer units. Since, in many cases relevant values will be available from published tables (see the monograph of Belousow, W. P., and Moratschewski, A. G., "Mischungswaermen von Fluessigkeiten", pub. Verlag Chemie, Leningrad, 1970). According to definition, in the above formulas (I, II, I-hydr, and II-hydr), $R_2$ and $R_4$ represent ethyl or a hydrocarbon group with 4–40 carbon atoms, preferably a noncyclic, optionally branched, alkyl group, particularly with 4–24 carbon atoms, or a cyclic hydrocarbon group, or a phenyl or naphthyl group. According to definition, P1 and P2 are disparate (different). In general, their monomer composition differs in the extent of >50 mol%, preferably >60 mol%, particularly preferably ≧80 mol%. In general, P1 and P2 should also differ in physical parameters and polymer species. As a rule, the dominating monomers i.e. those of formulas I and II in polymers P1 and P2 should differ.

Preferably, the entire monomer unit composition of polymer P1 is comprised of monomers of formula I, and the entire monomer unit composition of polymer P2 is comprised of monomers of formula II. Particularly preferably, P1 and P2 are hommopolymers. Copolymers comprised of more than one representative of monomer groups I and II are also advantageous, provided the above-listed conditions are satisfied, in particular provided the polymers P1 and P2 are mutually compatible.

It is further understood within the scope of the invention that polymers P1 and P2 may contain other monomer units in addition to monomers of formulas I and II; i.e., P1 and P2 may be copolymers, provided that the said other monomer units do not eliminate the compatibility and are useful for the envisioned applications.

In general the amount of these other monomer units (monomers of formulas III and/or IV, below) is in the range 0.5–40 wt.%, preferably 1–20 wt.%, based on the total weight of monomers in the given polymer.

The monomers copolymerizable with monomers I and/or II are preferably of formula III:

(III)

wherein R represents hydrogen or methyl, and Y represents a phenyl group, optionally substituted in the para or meta position with an alkyl group having 1-4 carbon atoms; or a —COOR$_5$ group, where R$_5$ represents methyl or a —CONHR$_6$ group, where R$_6$ represents R$_2$ or R$_5$ defined above. Likewise, monomers of the vinyl ester type, e.g., vinyl acetate, may be copolymerized.

The monomers copolymerizable with monomers I and/or II may also be of formula IV:

(IV)

where R represents hydrogen or methyl, as previously, and X represents a crosslinkable function, preferably a group

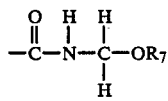

where R$_7$ is hydrogen or an alkyl group with 1-6 carbon atoms.

Examples of formula III include the monomers styrene, alpha-methylstyrene, p-methylstyrene, m-methylstyrene, vinyl acetate, vinyl propanoate, vinyl butanoate; and esters of (meth)acrylic acid which are different from monomers I and II, e.g., methyl methacrylate.

Examples of formula IV of interest include N-butoxymethyl methacrylamide and N-methylol (meth)acrylamide. Generally, X in formula IV may represent an activated group and its reaction partner. Thus, in Ger. Pat. App. P 31 16 955.3, a whole series of nucleophilically attackable groups X is listed, including, e.g., the oxirane group and the thioisocyanate group. In some cases it is particularly advantageous if the polymers P1 and P2 contain disparate monomers (IV), so that reactions of polymer P1 with polymer P2 can be carried out in controlled fashion. For example, polymer P1 contains an isocyanate group, and polymer P2 and alcohol group. In this way, polymer P1 can be bound to polymer P2 with the formation of a urethane bond. The proportion of crosslinkable monomers is a rule $\leq 5$ wt.% based on the total weight of the monomers in polymers P1 and P2, and in general is between 0.1 wt.% and 3 wt.%.

In addition to these crosslinkable monomers, the polymers P1 or P2 may also contain polymerization crosslinking agents, which are understood to be monomers containing more than one vinyl group. Examples are the (meth)acrylate esters of polyhydric alcohols, e.g. 1,1,1-tris(hydroxymethyl)propane triacrylate or hexanediol diacrylate; and crosslinking agents with two vinyl groups of different reactivity, e.g. allyl methacrylate or vinyl methacrylate. Others which might be mentioned include divinylbenzene, trisallylcyanurate, etc.(*) To the extent the crosslinking agents are used together with chain regulators, it is possible to produce soluble polymers despite use of the crosslinking agents. However, it should be emphasized here that it is not critically necessary for the inventive compatible polyblends that both polymers (P1, P2) be un-crosslinked. This is contrary to prior teaching in the art which will be discussed in detail below in connection with the features of these polyblends.

(*)(c.f. H. Rauch-Puntigam, Th. Völker, Acryl- und Methacrylverbindungen, Springer Verlag, Berlin—New York, 1967).

It is also possible to copolymerize additional functional monomers into the polymers P1 and P2, as appropriate with regard to the desired properties of the final product. Such monomers may include, for example, polymerizable acids such as (meth)acrylic acid, monoesters of polyhydric alcohols (e.g. hydroxyethyl acrylate), amides (e.g., methacrylamide), etc. As a rule, these monomers are copolymerized into the polymer in the amount of <10 wt.% of the monomers, preferably <5 wt.%, and at least 0.01 wt.%, preferably 0.1 wt.%. Advantages which may be provided by said monomers include, e.g., improved pigment binding, improved adhesion, etc.

The Polyblends PB

The following factor is important in selecting the monomers: The desired technical result, namely miscibility of the polymers P1 and P2, is generally assured if there is good spatial correspondence between R$_2$ and R$_4$.

A qualitative and quantitative indication and measure of such correspondence is equality of the van der Waals volumes (calculated according to Bondi, loc. cit.), and comparability of the degree of branching of the ester groups. The result of deviations from these criteria is reduced compatibility. Thus, only minimal compatibility has been observed between poly-t-butyl acrylate and poly-n-butyl acrylate; whereas poly-n-butyl acrylate and poly-n-butyl methacrylate have good compatibility, as do polycyclohexyl acrylate and polycyclohexyl methacrylate.

Good compatibility has also been found between polycyclohexyl (meth)acrylate and polyphenyl methacrylate.

As a general rule, in systems comprised of polymer P1 with R$_1$=H, and P2 with R$_3$=methyl, particularly if R$_2$=R$_4$, with relatively large ester group (no. of carbon atoms <40 and >5) which are spatially fixed (i.e. are relatively inflexible), relatively good compatibility is found. As examples of such good compatibility, one may cite esters with cyclohexyl groups and 3,3,5-trimethylcyclohexyl groups.

If the polymers P1 and P2 are not compatible over the entire temperature range, as a rule the compatibility is found at higher temperatures, i.e. all these polyblends display UCST behaviour. Contrary to the teaching of other prior publications, in general polyalkyl acrylates and polyalkyl methacrylates are fully compatible if their side chains (e.g. R$_2$ and R$_4$) coincide; and their compatibility is more pronounced the more sterically demanding(*) their side chains are.

(*)(of relatively fixed geometry, usually voluminous)

As a rule, polymers with sterically demanding groups are compatible already at room temperature or slightly thereabove. An example is polyblend "PB-6", poly-3,3,5-trimethylcyclohexyl acrylate/poly-3,3,5-trimethylcyclohexyl methacrylate. In cases where R$_2$ and R$_4$ are sterically less demanding groups, compatibility is found only at elevated temperature (e.g., 200° C.).

The Polymers P1 and P2

The polymers P1 and P2 are per se known (see Brandrup, J., and Immergut, E. H., eds., 1975, "Polymer Handbook", 2nd Ed., pub. Wiley-Interscience; and Rauch-Puntigam, H., and Voelker, Th., 1967, "Acryl- und Methacrylverbindungen", pub. Springer-Verlag).

They may be manufactured according to the ordinary polymerization methods, particularly radical or group-transfer polymerization. Radical polymerization methods preferably employ the customary radical initiators, e.g., peroxide-like substances, particularly organic peroxide compounds or azo compounds, in amount of 0.01–1 wt.% based on the weight of the monomers. Chain Regulators employed may be, e.g., the customary sulfur-containing regulators, particularly mercaptans.

According to the available observations, the molecular weight does not have a crucial influence on the miscibility of the inventively employed polymers P1 and P2. This applies particularly for the case where $R_2$ and $R_4$ and sterically demanding and have the same or nearly the same van der Waals radius. However, the molecular weight has a marked influence on the position of the UCST. Thus, in the case of low molecular weight polymers, miscibility is often found at room temperature, whereas with high molecular weights compatibility is often found only at temperatures >100° C. or >150° C. Both cases are of industrial interest—that of compatibility at room temperature and that of compatibility only at high temperatures. The position of the temperature range of compatibility is of decisive importance for the specific applications of the polyblends.

As a guideline, a molecular weight $\overline{M}_w$ of 5,000 to 1,000,000, preferably 10,000 to 200,000 is recommended. The molecular weight is determined by light scattering. Polydispersity in the molecular weights(*) is in the range 0.1 to 10.

(*)($\overline{M}_w/\overline{M}_n$; c.f. Kirk-Othmer 3rd Ed. Vol. 18, pg. 208, J. Wiley, 1982)

TABLE 1

Examples of Polyblends PB

| P1 | | P2 | | |
|---|---|---|---|---|
| $R_1$ | $R_2$ | $R_3$ | $R_4$ | Example |
| $CH_3$ | Ethyl | H | Ethyl | PB1 |
| $CH_3$ | n-Butyl | H | n-Butyl | PB2 |
| $CH_3$ | iso-Butyl | H | iso-Butyl | PB3 |
| $CH_3$ | Cyclohexyl | H | Cyclohexyl | PB4 |
| $CH_3$ | n-Decyl | H | n-Decyl | PB5 |
| $CH_3$ | 3,3,5-Trimethyl-cyclohexyl | H | 3,3,5-Trimethyl-cyclohexyl | PB6 |
| $CH_3$ | 2-Ethylhexyl | H | 2-Ethylhexyl | PB7 |
| $CH_3$ | n-Butyl | H | iso-Butyl | PB8 |
| $CH_3$ | iso-Butyl | H | n-Butyl | PB9 |
| $CH_3$ | iso-Butyl | $CH_3$ | n-Butyl | PB10 |
| $CH_3$ | n-Butyl | $CH_3$ | iso-Butyl | PB11 |
| $CH_3$ | Phenyl | H | Cyclohexyl | PB12 |
| $CH_3$ | Phenyl | $CH_3$ | Cyclohexyl | PB13 |

Criteria of Compatibility

As defined, the inventive polyblends PB are compatible blends. The case in which the polyblends are compatible at room temperature is of interest, as is that in which compatibility occurs only at high temperature. The location of the temperature range of compatibility is of decisive importance for the specific applications of the polyblends.

In the context of the invention, and in keeping with the concepts adhered to in conventional polymer chemistry practice, the term "compatible" applied to a blend will be understood to mean a stable homogeneous mixture which macroscopically displays the properties of a single-phase material (see "Kirk-Othmer", loc. cit., Vol. 18, pp. 446, 457–460; and Brandrup and Immergut, "Polymer handbook", loc. cit., p. III-211).

The following will be regarded as criteria for the compatibility. These in a accordance the criteria adopted in the standard texts.

(I) Observation of the glass temperature, Tg.

To the extent that the polymer components have glass temperatures which differ from each other sufficiently to be differentiable by differential scanning calorimetry (DSC), dilatometry, dielectric measurements, or radio luminescence spectroscopy, compatibility will be evidenced by a shift in or disappearance of the Tg's of the individual polymeric components (see Olabisi et al., "Polymer-polymer miscibility", loc. cit., pp. 21, 123).

(II) The "optical method".

A film is cast from a homogeneous solution of the polymer components, and the film is dried and examined. Even under magnification, no optically discernible inhomogeneity is present, if the blend is compatible.

In this connection, the occurrence of a UCST is relevant. A UCST is defined as temperature-vs.-composition phase behavior of a polyblend following the form of FIG. 1 where the hatched region represents phase separation.

Figure 1:
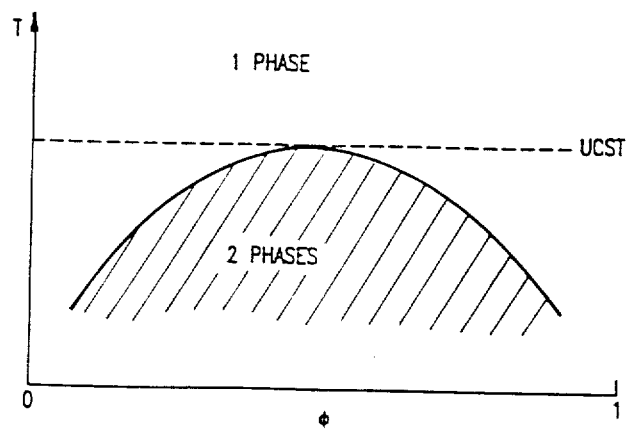
FIG. 1 shows the phase behavior diagram of binary blends with UCST.

As discussed above, to the extent the inventive polyblends PB are not compatible over the entire usual temperature range of −50° to 300° C. which is to be considered in connection with their processing and use, the polyblends are at least compatible at elevated temperatures, i.e. the inventive polyblends display UCST behavior. A number of inventive polyblends are listed in Table 1.

According to the state of art, UCST behavior is very seldom encountered, compared to LCST behavior (see, e.g., Olabisi et al., "Polymer-polymer miscibility", loc. cit., p. 268).

Thus, in Walsh, D. J., Higgins, J. S., and Maconnachie, A., 1985, "Polymer blends and mixtures", pub. Martinus Nijhoff Pubs., Boston, p. 2, it is stated, "LCST behavior is rather common in polymer blends while UCST behavior is usually limited to cases where miscibility is the result of the low molecular weight of the components, e.g. mixtures of "oligomers".

According to this statement, UCST behavior in polyblends is limited to cases of low molecular weight polymers P1 and P2.

As mentioned above, it has been discovered, surprisingly, in connection with the invention, that the inventive polyblends display compatibility with UCST behavior even if the polymers have quite high molecular weights. Further, UCST behavior has been observed in the inventive polyblends even when one of the two polymers used has been crosslinked.

The thermodynamic conditions for miscibility are as follows:

$$\Delta G_{mix} = \Delta H_{mix} - T\Delta S_{mix} \tag{1}$$

is subject to the conditions.

$$\Delta G_{mix} < O \text{ and } \left( \frac{\partial^2 \Delta G_{mix}}{\partial (\phi_1)^2} \right)_{T,P} > O$$

for the inventive polyblends with UCST behavior. Here $\phi_1$ is the volume fraction represented by polymer P1 in the blend. Thus it is clear that, due to the similar structures of P1 (e.g. poly-n-butylmethacrylate) and P2 (e.g. poly-n-butylacrylate), one cannot expect an exothermic specific interaction (with $\Delta H_{mix} << O$). Rather, it is expected that $\Delta G_{mix} < 0$ will be due to a positive entropy of mixing, $\Delta S_{mix}-0$. This indicates that the compatibility of polymers P1 and P2 exists particularly at higher temperatures, with the UCST behavior attributable to the attendant increase in the term $T\Delta S_{mix}$.

Eq. (1) above may be written as $$\Delta G_{mix} = \Delta H_{mix} - T \left( \Delta S_{mix}^{comb} + \Delta S_{mix}^{excess} \right) \quad (2)$$

The entropy of mixing $\Delta S_{mix}$ can thus be broken down into a combinatorial part, $\Delta S_{mix}^{comb}$; and an excess part $\Delta S_{mix}^{excess}$. (In this connection, see Barlow, J. W., and Paul, D. R., 1981, *Annu. Rev. Mater. Sci.*, 300.) As mentioned above, the compatibility of the inventive polyblends is not limited to low molecular weights, and miscibility has been observed even with one of two polymers being crosslinked. Therefore the compatibility cannot be solely due to the combinatorial entropy, but in the present case of compatible polyblends are expects a positive excess entropy. Conventionally this is explained as the effect of the free volume. This has yet little of use to offer the practitioner.

Figure 2:
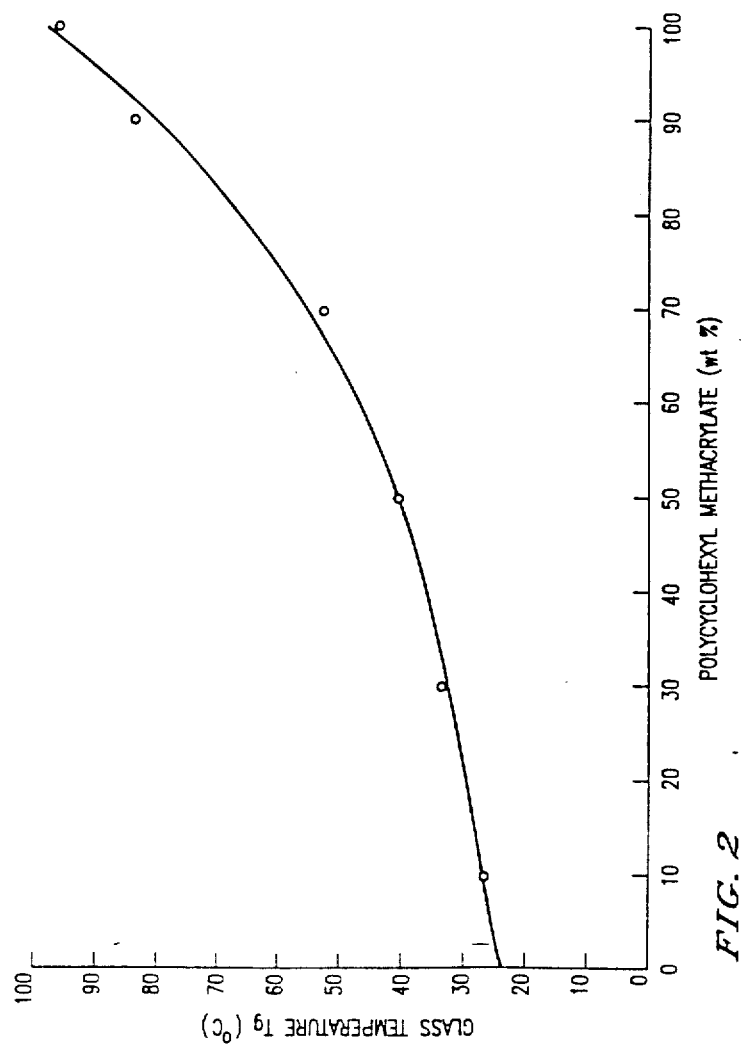
FIG. 2 shows a diagram of glass temperature Tg as a function of composition for polyblend PB-4.

The general rule for compatibility of polymers P1 and P2 may be stated as follows: Compatibility is displayed particularly when the mobility of the polymers is increased upon mixing. This is also expressed by the lowering of the glass temperature of the mixture (see FIG. 2). In the above formulas, this is always the case for ($R_1$=H and $R_2$=CH$_3$), if $R_2$=$R_4$; thus if a polyacrylate is mixed with the corresponding polymethylacrylate. The effect is pronounced if $R_2$ (=$R_4$) is a sterically demanding group, e.g. a cycloalkyl group. Particularly good results are obtained, for example, if $R_2$ (and $R_4$) is a 3,3,5-trimethylcyclohexyl group.

In contrast, the polyblend "PB-7" (poly-2-ethylhexyl methacrylate/poly-2-ethylhexyl acrylate) displays compatibility only at elevated temperatures (see Table 1). The same is true of polyblend "PB-5" (with $R_2$=$R_4$=n-decyl).

Accordingly, groups $R_2$ which are sterically demanding, and are of types which, e.g., in combination with $R_1$=CH$_3$ give particularly rigid polymers, are particularly preferred. Apparently this results in a possible substantial increase in chain mobility when the polymer is mixed with the corresponding acrylate (with $R_3$=H and $R_4$=$R_2$), rendering miscibility possible in many cases even at room temperatures.

However, in the groups $R_2$ and $R_4$ need not be identical. It suffices that they correspond well in size and shape. This may be illustrated with the example of polyblends "PB-12" and "PB-13" (Table 1). Thus the phenyl group matches the cyclohexyl group spatially. Compatibility is also observed between poly-i-butyl methacrylate and poly-n-butyl acrylate ("PB-9"). In this connection, as a general rule, there is incompatibility if $R_2$ and $R_4$ differ in more than two carbon atoms. As a rule, for a difference of more than one carbon atom the compatibility is less. Particularly preferred are blends wherein $R_2$ and $R_4$ have the same number of carbon atoms. The blend PB-1 in Table 1 is a special case, in that as a rule, $R_2$ and $R_4$ should be large enough so that the difference $R_1$=H, $R_2$=CH$_3$ is not a major factor. In particular, as a rule $R_2$ and $R_4$ should each have at least 4 carbon atoms. In a sense, there is thus a certain similarity between the inventive poly(meth)acrylate blends and the discovery of H. G. Braun and G. Rehage, in studies of 17 rubber mixtures, that the side chains have the maximum influence on the compatibility (see 1985 *Angew. Makromol. Chem.*, 131: 107–115).

As stated a number of times hereinabove, most of the inventive polyblends PB have a UCST in the experimentally accessible region. It is their UCST behavior which opens up special potential applications for the inventive polyblends.

Advantageous Effects

Reference is made to Olabisi, in "Polymer-polymer miscibility", loc. cit., 277–319, for the thermal, thermochemical, mechanical, electrical, and rheologic-viscoelastic properties of compatible polyblends, and the potential applications stemming therefrom. In addition there are special advantageous applications as follows:

(1) The inventive polyblends PB which are completely compatible even at room temperature may be used, e.g., as bases for paints or varnishes. A wide range of variability is available for customizing the properties of the product, by simple mixing of two suitable compatible polymers P1 and P2. Thus two polymers P1 and P2 which are compatible at room temperature may be readily mixed to yield a whole series of clear polymers having different glass temperatures. The area of application of polyblends which are incompatible at room temperature but compatible at higher temperature is viewed differently, from the standpoint of applications engineering. Regular, clear films or plates can be prepared from these polyblends PB at elevated temperature, which are white when brought to room temperature (weather-stabile, "white pigmented" films).

(2) Based on the improvement in compatibility with increase of temperature, the polyblends PB with UCST may be employed to produce thermosensitization elements, e.g., paints which become highly viscous when temperature is increased.

(3) The increase in viscosity with increasing temperature may be employed in grease and lubricant technology, e.g., for motor oils or hydraulic fluids with temperature-dependent viscosity.

(4) Another potential area of application, particularly where the polymers P1 and P2 contain crosslinkable groups, i.e., where monomers of formula II are copolymerized in small amounts, as in the area of plastisols.

Plastisols based on poly(meth)acrylates are known from, e.g., U.S. Pat. Nos. 4,210,567, 4,071,653, 4,199,486, and 4,558,084. The technology recommended in these patents may be applied, mutatis mutandis, to the inventive polyblends PB. Of particular interest, e.g., are plastisols based on polyblends of poly-i-butyl methacrylate with small amounts of crosslinkable monomer units of formula IV, e.g., n-butoxymethyl methacrylamide, preferably in the form of the spray-dried product (polymer "P1-9V", along with poly-n- butyl acrylate with small amounts of n-butoxymethyl methacrylamide (polymer "P2-9V").

Such plastisols have a practically unlimited shelf life, they may be manufactured without plasticizers if desired, and when baked onto metallic substrates, particularly cataphoresis plates, they form tough coatings with excellent adhesion.

Preferably the amount of crosslinkable monomers of formula IV is in the range of 0.1–5 wt.%, based on the total weight of the monomer units.

(5) Another promising application is in reactive injection molding. Flowable pastes can be injected into a suitable mold at room temperature or slightly thereabove, the temperature can be raised above the UCST, and then the material can be hardened. Examples are blends of copolymers of the type:
polyethyl methacrylate with 1wt-% methacrylic acid, along with polyethyl acrylate with 2 wt-% glycidyl groups.

(6) These are broad applications for polyblends PB with UCST wherewith the Tg of polymer component P1 is greater than room temperature, but Tg of polymer component P2 is less than room temperature. E.g., such polyblends may be used in high impact plastics.

The polymers P1 and P2 are intermixed at a molecular level at T>UCST. This enables chemical reactions e.g. condensation between P1 and P2. If the mass is then cooled to below the UCST, de-blending occurs, to form separate phases. However said reactions carried out at T>UCST result in binding of the "rubbery" phase to the "hard" phase. It is noted that it is technically impracticable to carry out chemical reactions between polymers P1 and P2 if they are incompatible (e.g. P1=PMMA and P2=poly-n-butyl acrylate).

(7) Another application is in production of plastic bodies with a temperature-controlled softening temperature. Thus, if poly-i-butyl methacrylate (P1) (prepared by emulsion polymerization and subsequent water removal) is mixed into polybutyl acrylate rubber (P2), the result is a material which at T>room temperature is solid, single-phase, and non-sticky. At low temperatures (i.e. at <UCST), however, the system is two-phase, with poly-i-butyl methacrylate as a "pigment" incorporated in a matrix comprised of polybutyl acrylate rubber.

Other features of the invention will become apparent in the course of the following descriptions of exemplary embodiments which are included for illustration of the invention and are not intended to be limiting thereof.

EXAMPLES

The values of limiting viscosity J given were determined according to IZOD 1628-6 or DIN 7745-II Heading 3.

The polyblends PB may be prepared, e.g., by the methods given below.

EXAMPLES 1–13

In each case, polymer P1 in the amount of 20 wt.% was dissolved in the monomers forming polymer P2 (present in the amount of 80 wt.%), and polymerization was carried out thoroughly for 24 hr with addition of an initiator (t-butylperneodecanoate, in the amount of 0.1 wt.%), and a regulator (dodecyl mercaptan, in the amount of 0.3 wt.%), at 50° C., to yield a polyblend PB comprised of P1 (20 parts by wt.) and P2 (80 parts by wt.)

Polymer P1 was prepared by polymerizing the respective monomer without solvent but with the addition of dodecyl mercaptan in the amount of 0.33 wt.% and 2,2-azobis(i-butyronitrile) in the amount of 0.15 wt.%, at 60° C. for about 3 hr. The polymer was then precipitated in methanol, dissolved in dichloromethane, reprecipitated in methanol, and dried in vacuum at 70° C. The solution viscosities of three of the polymers used are given by way of example:
J (polyethyl methacrylate)=22 ml/g;
J (polybutyl methacrylate)=9 ml/g;
J (polycyclohexyl methacrylate)=28 ml/g.

The thus prepared polyblends "PB-1" to "PB-13" are characterized in the following Table 2. As may be seen, compatibility is particularly found at elevated temperature (i.e., UCST behavior is observed).

TABLE 1

| | P1 (20 parts by wt.) | | P2 (80 parts by wt.) | | Compatibility* | | |
|---|---|---|---|---|---|---|---|
| | R₁ | R₂ | R₃ | R₄ | −15° C. | 25° C. | 120° C. |
| PB 1 | CH₃ | Ethyl | H | Ethyl | | − | + |
| PB 2 | CH₃ | n-Butyl | H | n-Butyl | − | + | |
| PB 3 | CH₃ | iso-Butyl | H | iso-Butyl | | − | + |
| PB 4 | CH₃ | Cyclohexyl | H | Cyclohexyl | − | + | |
| PB 5 | CH₃ | n-Decyl | H | n-Decyl | | − | + |
| PB 6 | CH₃ | 3,3,5-Trimethyl-cyclohexyl | H | 3,3,5-Trimethyl-cyclohexyl | | + | |
| PB 7 | CH₃ | 2-Ethylhexyl | H | 2-Ethylhexyl | | − | + |
| PB 8 | CH₃ | n-Butyl | H | iso-Butyl | | − | + |
| PB 9 | CH₃ | iso-Butyl | H | iso-Butyl | | −+ | + |
| PB 10 | CH₃ | iso-Butyl | CH₃ | n-Butyl | | + | |
| PB 11 | CH₃ | n-Butyl | CH₃ | iso-Butyl | | + | |
| PB 12 | CH₃ | Phenyl | H | Cyclohexyl | | + | |
| PB 13 | CH₃ | Phenyl | CH₃ | Cyclohexyl | | + | |

*Compatibility for polyblends (prepared by radical polymerization) at temperatures stated.
− = incompatible
+ = compatible

EXAMPLE 14

Characterization of polyblend PB-4

20 wt.% solutions in toluene were prepared of polycyclohexyl acrylate (J=23 ml/g) and polycyclohexyl methacrylate (J=28 ml/g). These solutions were mixed in weight ratios of 90:10, 70:30, 50:50, 30:70, and 10:90. Films were cast from these solutions, and were dried in vacuum. The glass temperature Tg of each of the thus prepared polyblends was determined by DSC (differential scanning calorimetry). Only one glass temperature was found for all mixture ratios. As seen from FIG. 2, the glass temperature is a function of the composition of the polyblend. This, along with the optical evaluation of the polyblend (as transparent), may be regarded as proof of the compatibility of the polyblend "PB-4".

Preferably, DSC is used for determining the glass temperature Tg for demonstrating the compatibility of the polyblends PB. (See Turi, E. A., ed., 1981, "Thermal characterization of polymeric materials", pub. Academic Press, N.Y., pp. 169ff.)

EXAMPLE 15

Phase diagram of polyblend "PB-1"

Polyethyl acylate was prepared by polymerization of ethyl acetate without solvent but with addition of dodecyl mercaptan in the amount of 0.5 wt.% and butylperneodecanoate in the amount of 0.1 wt.%. The polymer was purified by reprecipitation from dichloromethane and methanol as per Examples 1–13. The polyethyl acrylate thus produced was dissolved in toluene to form a 20 wt.% solution, and this solution was mixed in various proportions with a 20 wt.% solution of polyethyl methacrylate in toluene. Films were cast from the solution mixtures, and were dried in vacuum. The result was cloudly, de-blended polymer films, which became clear upon heating on a heating plate at a specific temperature.

Figure 3:
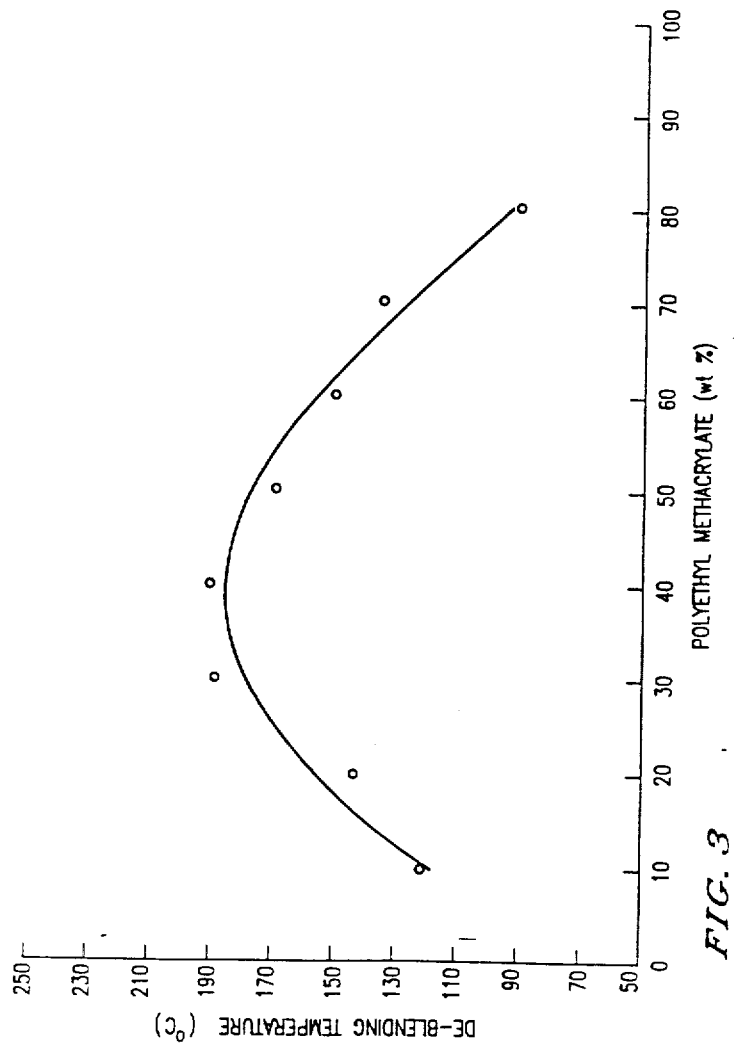
FIG. 3 is a phase diagram of the de-blending temperature as a function of composition of polyblend PB-1.

The solubility curve is shown in FIG. 3. The transition from clear to de-mixed is reversible, and thus can be determined accurately by repeated measurements. The accuracy of the solubility/de-mixing points in FIG. 3 is about ±10° C.

EXAMPLE 16

Phase diagram of polyblend "PB-2"

Butyl acrylate was polymerized without solvent but with addition of azobis(isobutyronitrile) in the amount of 0.15 wt.% and 2-hydroxyethyl mercaptan in the amount of 0.5 wt.%, with reaction for 24 hr at 50° C., followed by 4 hr at 90° C. After workup, the product was a clear, honeylike liquid (J=13 ml/g).

The butyl acrylate thus prepared was dissolved in toluene to form a 20 wt.% solution, and this solution was mixed in various proportions with a 20 wt.% solution of polybutyl methacrylate in toluene. Films were cast from the solution mixtures, and were dried in vacuum. The result was cloudy, de-blended polymer films, which became clear upon heating at a specific temperature.

Figure 4:
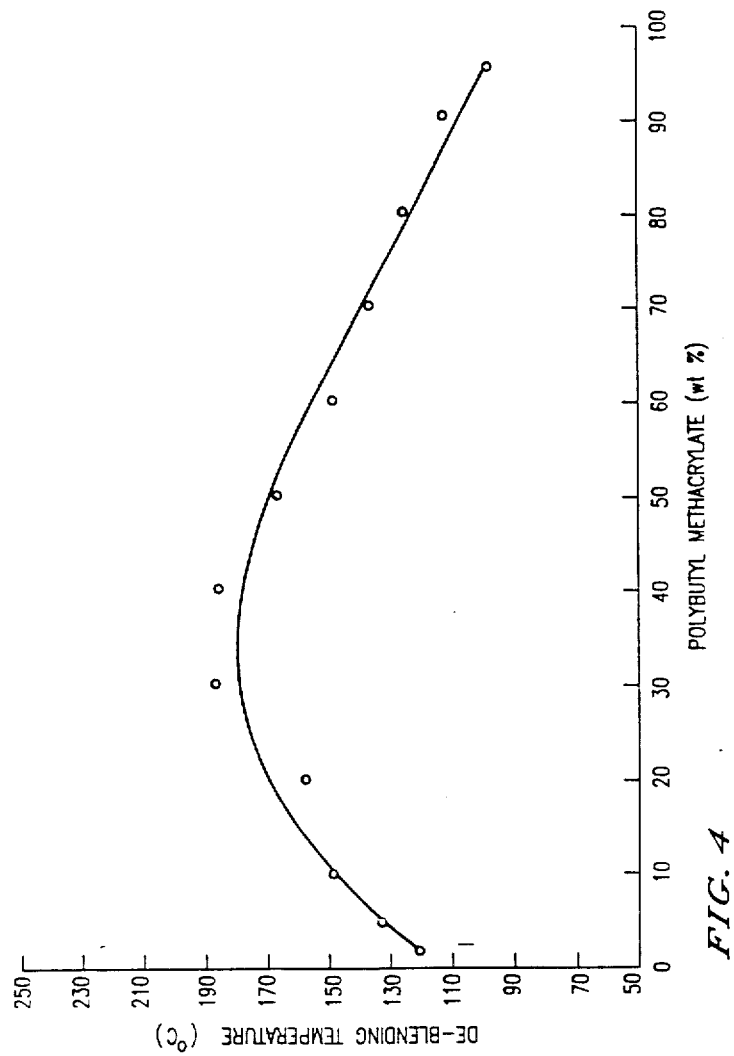
FIG. 4 is a phase diagram of the de-blending temperature as a function of composition of PB-2.

The solubility curve is shown in FIG. 4. The transition from clear to de-blended is reversible, and thus can be determined accurately by repeated measurements.

Differences in the de-blending temperatures given in FIG. 4 and Table 1 are attributable to differences in molecular weight and in the molecular weight distribution of the polymers employed in the two experiments.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the U.S. is:

1. A compatible polymer blend of two disparate polymers, consisting essentially of:

(A) 1–99 wt.% of a first polymer consisting essentially of monomer units of formula (I):

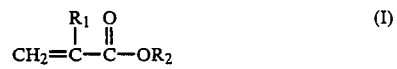

wherein $R_1$ is hydrogen or methyl, and $R_2$ is ethyl or a hydrocarbon group with 4–40 carbon atoms; and (B) 99–1 wt.% of a second polymer consisting essentially of monomer units of formula (II):

wherein $R_3$ is hydrogen or methyl, and $R_4$ is ethyl or a hydrocarbon group with 4–40 carbon atoms; wherein said polymers are compatible within room temperature to +200° C., and are compatible in a partial range thereof which extends over at least 50° C. and wherein (a) the sum of (A)+(B)=100 wt.%;
(b) $R_1$ and $R_3$ are different; and
(c) the groups $R_2$ and $R_4$ have similar van der Waals volumes.

2. The compatible polymer blend of claim 1, wherein monomers (I) and (II) satisfy the condition that the heats of mixing of the hydrogenated compounds corresponding to the monomers (I) and (II) are less than 100 cal per mole of the blend.

3. The compatible polymer blend of claim 1, wherein the number of carbon atoms in group $R_2$ equals the number of carbon atoms in group $R_4$.

4. The compatible polymer blend of claim 1, wherein the van der Waals volumes of groups $R_2$ and $R_4$ differ by less than 30%.

5. The compatible polymer blend of claim 1, wherein $R_1$ is methyl, $R_2$ is ethyl, $R_3$ is hydrogen, and $R_4$ is ethyl.

6. The compatible polymer blend of claim 1, wherein $R_1$ is methyl, $R_2$ is n-butyl, $R_3$ is hydrogen, and $R_4$ is n-butyl.

7. The compatible polymer blend of claim 1, wherein $R_1$ is methyl, $R_2$ is i-butyl, $R_3$ is hydrogen, and $R_4$ is i-butyl.

8. The compatible polymer blend of claim 1, wherein $R_1$ is methyl, $R_2$ is cyclohexyl, $R_3$ is hydrogen, and $R_4$ is cyclohexyl.

9. The compatible polymer blend of claim 1, wherein $R_1$ is methyl, $R_2$ is n-decyl, $R_3$ is hydrogen, and $R_4$ is n-decyl.

10. The compatible polymer blend of claim 1, wherein $R_1$ is methyl, $R_2$ is 3,3,5-trimethylcyclohexyl, $R_3$ is hydrogen, and $R_4$ is 3,3,5-trimethylcyclohexyl.

11. The compatible polymer blend of claim 1, wherein $R_1$ is methyl, $R_2$ is 2-ethylhexyl, $R_3$ is hydrogen, and $R_4$ is 2-ethylhexyl.

12. The compatible polymer blend of claim 1, wherein $R_1$ is methyl, $R_2$ is n-butyl, $R_3$ is hydrogen, and $R_4$ is i-butyl.

13. The compatible polymer blend of claim 1, wherein $R_1$ is methyl, $R_2$ is i-butyl, $R_3$ is hydrogen, and $R_4$ is n-butyl.

14. The compatible polymer blend of claim 1, wherein $R_1$ is methyl, $R_2$ is i-butyl, $R_3$ is methyl, and $R_4$ is n-butyl.

15. The compatible polymer blend of claim 1, wherein $R_1$ is methyl, $R_2$ is phenyl, $R_3$ is hydrogen, and $R_4$ is cyclohexyl.

16. The compatible polymer blend of claim 1, wherein said blend has an "upper critical solution temperature" (UCST).

17. The compatible polymer blend of claim 16, wherein said UCST is in the range $-50°$ to $+130°$ C.

18. The compatible polymer blend of claim 1, wherein said first or second polymers further consists essentially of 0.5–40% by wt. of monomer units having formula (III) or (IV):

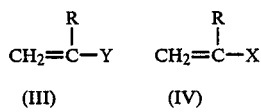

(III)  (IV)

wherein R is hydrogen or methyl, and Y is a phenyl group, a phenyl group substituted in the para or meta position with a $C_{1-4}$ alkyl group, or a $—COOR_5$ group, where $R_5$ is methyl or a $—CONHR_6$ group, wherein $R_6$ is $R_2$ or $R_5$, and X is a crosslinkable function.

19. The compatible polymer blend of claim 18, wherein said monomer units having formula (III) are selected from the group consisting of styrene, alpha-methylstyrene, p-methylstyrene, m-methylstyrene, vinyl acetate, vinyl propanoate, vinyl butanoate and esters of (meth)acrylic acid which differ from monomers (I) and (II).

20. The compatible polymer blend of claim 18, wherein said monomer units having formula (IV) are selected from the group consisting of N-butoxymethyl methylacrylamide and N-methylol (meth)acrylamide.

21. The compatible blend of claim 18, wherein said crosslinkable function is:

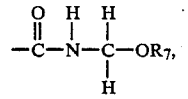

wherein $R_7$ is hydrogen or $C_{1-6}$ alkyl.

UNITED STATES PATENT AND TRADEMARK OFFICE
CERTIFICATE OF CORRECTION

PATENT NO. : 4,900,791
DATED : February 13, 1990
INVENTOR(S) : Werner Siol, et al.

It is certified that error appears in the above-identified patent and that said Letters Patent is hereby corrected as shown below:

The title page should be deleted to appear as per attached title page. The sheets of drawings consisting of figures 1-4, should be added as shown on the attached pages.

Signed and Sealed this

First Day of March, 1994

*Attest:*

BRUCE LEHMAN

*Attesting Officer*     *Commissioner of Patents and Trademarks*

United States Patent [19]

Siol et al.

[11] Patent Number: 4,900,791

[45] Date of Patent: Feb. 13, 1990

[54] COMPATIBLE POLYBLENDS

[75] Inventors: Werner Siol, Darmstadt-Eberstadt; Ulrich Terbrack, Reinheim, both of Fed. Rep. of Germany

[73] Assignee: Röhm GmbH Chemische Fabrik, Darmstadt, Fed. Rep. of Germany

[21] Appl. No.: 160,313

[22] Filed: Feb. 25, 1988

[30] Foreign Application Priority Data

Mar. 16, 1987 [DE] Fed. Rep. of Germany ....... 3708427

[51] Int. Cl.⁴ .................... C08L 33/00; C08G 63/52
[52] U.S. Cl. .................... 525/228; 528/303; 528/306
[58] Field of Search ................. 525/228; 528/306, 303

[56] References Cited

U.S. PATENT DOCUMENTS

| | | | |
|---|---|---|---|
| 3,846,368 | 11/1974 | Pettit, Jr. | 525/228 |
| 4,112,023 | 9/1978 | Gore et al. | 525/228 |
| 4,414,053 | 11/1983 | Karim et al. | 525/228 |

FOREIGN PATENT DOCUMENTS

| | | | |
|---|---|---|---|
| 0963368 | 12/1983 | European Pat. Off. | 525/228 |
| 0177063 | 4/1986 | European Pat. Off. | |
| 0181485 | 5/1986 | European Pat. Off. | |

OTHER PUBLICATIONS

Chemical Abstracts, vol. 84, No. 13, Jan. 26, 1976, p. 79, Resume No. 18226x, Columbus Ohio, US.

I. I. Maleev et al: "Surface Pressure of Mixtures of Methacrylate Polymers with poly(methyl acrylates)", Tezisy Dokl.—Resp. Konf. Vysokomol. Soedin 3rd Journal of Applied Polymer Science, vol. 17, 1973, pp. 2443–2455.

L. H. Sperling et al.: "Glass Transition Behavior of Latex Interpenetrating Polymer Networks Based on Methacrylic/Acrylic Pairs", pp. 2445–2450.

Polymer-Polymer Miscibility, 1979 Academic Press, pp. 160, 161, 203, 204, 233, 234.

Primary Examiner—John C. Bleutge
Assistant Examiner—Susan Berman
Attorney, Agent, or Firm—Oblon, Spivak, McClelland, Maier & Neustadt

[57] ABSTRACT

The invention relates to compatible polymer blend comprised of two disparate polymers, namely:
(A) 1–99 wt. % of a first polymer comprised of monomer units of formula (I):

wherein $R_1$ is hydrogen or methyl, and $R_2$ is ethyl or a hydrocarbon with 4–40 carbon atoms; and
(B) 99–1 wt. % of a second polymer comprised of monomer units of formula (II):

wherein $R_2$ is hydrogen or methyl, and
$R_4$ is ethyl or a hydrocarbon group with 4–40 carbon atoms; and wherein:
(a) the sum of (A)+(B)=100 wt. %;
(b) when $R_2$ and $R_4$ are the same, then $R_1$ and $R_3$ are different, and when $R_1$ and $R_3$ are the same, then $R_2$ and $R_4$ are different; and
(c) the groups $R_2$ and $R_4$ have similar van der Waals volumes.

21 Claims, 4 Drawing Sheets

UNITED STATES PATENT AND TRADEMARK OFFICE
CERTIFICATE OF CORRECTION

PATENT NO. : 4,900,791

DATED : February 13, 1990

INVENTOR(S) : SOIL ET AL

It is certified that error appears in the above-identified patent and that said Letters Patent is hereby corrected as shown below:

Column 4, line 46, delete "hommopolymers", insert homopolymers.

Column 9, line 13, delete "$\Delta S_{mix}$--O", insert --$\Delta S_{mix} > 0$.

Column 12, line 37, delete "Table I" insert --Table II--.

Table II, line PB9, delete " $CH_3$  iso-Butyl  H  iso-Butyl", insert  -- $CH_3$  iso-Butyl  $\underline{\underline{H}}$  n-Butyl--.

Column 13, line 16, delete "acetate" insert --acrylate--.

Cover Sheet:  21 Claims 4 Drawings